United States Patent
Partington

(10) Patent No.: US 11,794,261 B2
(45) Date of Patent: *Oct. 24, 2023

(54) ROTARY TOOL FOR LOWER RECEIVER MANUFACTURING

(71) Applicant: BlackHawk Manufacturing Group Inc., Garden Grove, CA (US)

(72) Inventor: Wayne R. Partington, Sterling, MA (US)

(73) Assignee: BlackHawk Manufacturing Group Inc., Garden Grove, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/658,808

(22) Filed: Apr. 11, 2022

(65) Prior Publication Data
US 2023/0032401 A1 Feb. 2, 2023

Related U.S. Application Data

(63) Continuation of application No. 16/666,180, filed on Oct. 28, 2019, now Pat. No. 11,298,759, which is a
(Continued)

(51) Int. Cl.
*B23C 5/22* (2006.01)
*B23B 49/02* (2006.01)
(Continued)

(52) U.S. Cl.
CPC ............... *B23C 5/22* (2013.01); *B23C 3/12* (2013.01); *B23C 5/10* (2013.01); *B23B 49/00* (2013.01);
(Continued)

(58) Field of Classification Search
CPC ............... B23B 31/11; B23B 31/1107; B23B 31/1115; B23B 31/1122; B23B 2215/28;
(Continued)

(56) References Cited

U.S. PATENT DOCUMENTS

| 362,044 A | 4/1887 | Strange |
| 1,476,019 A | 12/1923 | William |

(Continued)

FOREIGN PATENT DOCUMENTS

| CA | 1137338 A | 12/1982 |
| EP | 0055307 A1 | 7/1982 |

(Continued)

OTHER PUBLICATIONS

80 Percent Arms Inc., "AR-15 Easy Jig® Manual," dated 2016, 20 pages.
5D Tactical LLC, A New Dimension in Firearms, "AR-15 & AR-308 Router Jig Instructions," dated as created Dec. 14, 2016 (as indicated by the PDF file metadata), 11 pages.
Modulus Arms, "Universal AR-15 80% Lower Receiver Jig Instructions," dated Mar. 25, 2015, 19 pages.
Modulus Arms, "AR-308/AR-10 Jig Instructions," dated Oct. 20, 2014, 24 pages.
(Continued)

*Primary Examiner* — Nicole N Ramos
(74) *Attorney, Agent, or Firm* — Knobbe Martens Olson & Bear LLP

(57) ABSTRACT

A rotary tool can be adapted for removing material from a workpiece such as a lower receiver. A rotary tool can have an adapter with a major diameter, and a cutter head with a minor diameter. The major diameter of the adapter can reduce deflection and chatter, while the minor diameter of the cutter head can be used to manufacture lower receivers with accuracy. The rotary tool can be adapted to be engaged with a rotary power tool.

16 Claims, 10 Drawing Sheets

Related U.S. Application Data continuation of application No. 15/809,938, filed on Nov. 10, 2017, now Pat. No. 10,456,846.

(51) Int. Cl.
  *B23B 49/04* (2006.01)
  *B23C 5/10* (2006.01)
  *B23C 3/12* (2006.01)
  *B23B 49/00* (2006.01)

(52) U.S. Cl.
  CPC ............ *B23B 49/02* (2013.01); *B23B 49/04* (2013.01); *B23C 2210/02* (2013.01); *B23C 2210/03* (2013.01); *B23C 2210/40* (2013.01); *B23C 2215/00* (2013.01)

(58) Field of Classification Search
  CPC ............ B23C 2210/03; B23C 2210/02; B23C 3/12; B23C 5/10
  See application file for complete search history.

(56) References Cited

U.S. PATENT DOCUMENTS

| | | |
|---|---|---|
| 2,273,954 A | 2/1942 | Grass |
| 2,363,085 A | 11/1944 | Roye |
| 2,393,424 A | 1/1946 | Selch |
| 2,455,644 A | 12/1948 | Barnes |
| 2,482,535 A | 9/1949 | Bayless |
| D160,734 S | 10/1950 | Polkosnik |
| 2,538,173 A | 1/1951 | Swebilius |
| 2,543,917 A | 3/1951 | Lloyd |
| 2,601,809 A | 7/1952 | Di Nardo |
| 2,859,645 A | 11/1958 | Emmons et al. |
| 2,896,677 A | 7/1959 | Payzant |
| 3,108,500 A | 10/1963 | Merriman |
| 3,141,509 A | 7/1964 | Bent |
| 3,149,534 A | 9/1964 | Stephens |
| 3,211,026 A | 10/1965 | Calahan |
| 3,358,375 A | 12/1967 | Lutz |
| 3,396,613 A | 8/1968 | Hutton |
| 3,494,229 A | 2/1970 | Judge |
| 3,555,964 A | 1/1971 | Fleming |
| 3,785,634 A | 1/1974 | Denker |
| 3,788,632 A | 1/1974 | Lukas |
| 3,789,892 A | 2/1974 | Converse et al. |
| 3,799,687 A | 3/1974 | Anderson |
| 3,811,163 A | 5/1974 | Frederick et al. |
| 3,984,192 A | 10/1976 | Wanner et al. |
| 4,145,160 A | 3/1979 | Wiggins |
| 4,155,383 A | 5/1979 | Welliver |
| 4,209,275 A | 6/1980 | Kim |
| 4,330,229 A | 5/1982 | Croydon |
| 4,448,406 A | 5/1984 | Hallberg |
| 4,475,437 A | 10/1984 | Sullivan |
| 4,484,608 A | 11/1984 | Ferdinand |
| 4,502,367 A | 3/1985 | Sullivan |
| 4,505,182 A | 3/1985 | Sullivan |
| 4,536,107 A | 8/1985 | Sandy et al. |
| 4,610,581 A | 9/1986 | Heinlein |
| 4,630,656 A | 12/1986 | Collins |
| 4,648,761 A | 3/1987 | Mitchell et al. |
| D291,529 S | 8/1987 | Degen |
| 4,735,007 A | 4/1988 | Gal |
| 4,738,574 A | 4/1988 | Emmert |
| 4,813,125 A | 3/1989 | Dacey, Jr. |
| 4,859,824 A | 8/1989 | Ukaji |
| 4,936,721 A | 6/1990 | Meyer |
| 4,948,306 A | 8/1990 | Wiedner et al. |
| 4,966,507 A | 10/1990 | Hanks |
| 5,017,056 A | 5/1991 | Morash |
| 5,059,059 A | 10/1991 | Cox |
| 5,094,279 A | 3/1992 | Dickey et al. |
| 5,102,271 A | 4/1992 | Hemmings |
| 5,123,463 A | 6/1992 | Grisley |
| 5,141,369 A | 8/1992 | Palace |
| 5,165,827 A | 11/1992 | Miller |
| 5,209,614 A | 5/1993 | Matthews |
| 5,311,654 A | 5/1994 | Cook |
| 5,358,364 A | 10/1994 | Kall |
| 5,378,091 A | 1/1995 | Nakamura |
| 5,492,160 A | 2/1996 | McCracken |
| 5,560,408 A | 10/1996 | DiFranco |
| 5,694,994 A | 12/1997 | Engler, III |
| 5,725,038 A | 3/1998 | Tucker |
| 5,967,712 A | 10/1999 | Magill et al. |
| 6,065,909 A | 5/2000 | Cook |
| 6,070,352 A | 6/2000 | Daigle |
| 6,138,726 A | 10/2000 | Newman |
| 6,158,487 A | 12/2000 | Licari |
| 6,394,466 B1 | 5/2002 | Matsumoto et al. |
| 6,481,937 B1 | 11/2002 | Sommerfeld et al. |
| 6,520,224 B2 | 2/2003 | Smith |
| 6,554,265 B2 | 4/2003 | Andronica |
| 6,557,730 B1 | 5/2003 | Kaye |
| 6,712,104 B1 | 3/2004 | Latshaw |
| 6,742,558 B1 | 6/2004 | Witt |
| 6,792,711 B2 | 9/2004 | Battaglia |
| 6,796,050 B2 | 9/2004 | Haimer et al. |
| 6,813,843 B1 | 11/2004 | Faubion |
| D528,930 S | 9/2006 | Degen |
| 7,108,463 B2 | 9/2006 | Hummel |
| 7,225,539 B2 | 6/2007 | Nowak et al. |
| 7,231,861 B1 | 6/2007 | Gauny et al. |
| 7,269,901 B2 | 9/2007 | Robin |
| 7,367,763 B2 | 5/2008 | Ruy Frota de Souza |
| D571,233 S | 6/2008 | Rys, Jr. |
| 7,588,400 B2 | 9/2009 | Taylor |
| 7,641,425 B2 | 1/2010 | Sommerfeld et al. |
| 7,819,146 B2 | 10/2010 | McDaniel |
| 7,857,020 B2 | 12/2010 | McDaniel |
| 7,871,224 B2 | 1/2011 | Dost et al. |
| 8,052,355 B2 | 11/2011 | Hirukawa et al. |
| 8,241,297 B2 | 8/2012 | Ashman |
| 8,327,749 B2 | 12/2012 | Underwood |
| 8,573,906 B2 | 11/2013 | Gowker |
| 8,584,372 B2 | 11/2013 | Stoffel |
| 8,656,622 B2 | 2/2014 | Peterson et al. |
| 8,683,725 B2 | 4/2014 | Munson |
| 9,009,986 B1 | 4/2015 | Chang et al. |
| 9,259,851 B2 | 2/2016 | Cardew |
| 9,662,717 B2 | 5/2017 | Prom et al. |
| 9,772,150 B2 | 9/2017 | Gomez |
| 9,802,332 B2 | 10/2017 | Davey |
| 9,810,517 B2 | 11/2017 | Chang et al. |
| D804,926 S | 12/2017 | Atkinson |
| 9,982,958 B1 | 5/2018 | Partington |
| D824,741 S | 8/2018 | Davis |
| 10,099,329 B1 | 10/2018 | Smith |
| 10,145,633 B1 | 12/2018 | Partington |
| D847,935 S | 5/2019 | Smith |
| 10,391,591 B2 | 8/2019 | Smith |
| 10,456,846 B1 | 10/2019 | Partington |
| 10,718,578 B2 | 7/2020 | Partington |
| 10,875,135 B2 | 12/2020 | Smith |
| 11,000,930 B1 | 5/2021 | Partington |
| 11,298,759 B2 | 4/2022 | Partington |
| 2001/0011564 A1 | 8/2001 | Darling |
| 2002/0021945 A1 | 2/2002 | Harpaz et al. |
| 2004/0065387 A1 | 4/2004 | Smith |
| 2004/0179906 A1 | 9/2004 | Hughes et al. |
| 2005/0025588 A1 | 2/2005 | Effrem |
| 2005/0086788 A1 | 4/2005 | Wasileski et al. |
| 2005/0120573 A1 | 6/2005 | Port |
| 2009/0065095 A1 | 3/2009 | McDaniel |
| 2010/0074701 A1 | 3/2010 | Kempen et al. |
| 2010/0303568 A1 | 12/2010 | York |
| 2011/0280676 A1 | 11/2011 | Nordlin |
| 2012/0005937 A1 | 1/2012 | Milino |
| 2013/0028675 A1 | 1/2013 | Vogler et al. |
| 2015/0027587 A1 | 1/2015 | Smith |
| 2015/0040414 A1 | 2/2015 | Nakamura et al. |
| 2015/0128396 A1 | 5/2015 | Motomura |
| 2017/0209941 A1 | 7/2017 | Chang et al. |

(56) References Cited

U.S. PATENT DOCUMENTS

| | | |
|---|---|---|
| 2018/0058835 A1 | 3/2018 | Chang et al. |
| 2019/0039192 A1 | 2/2019 | Smith |
| 2019/0210170 A1 | 7/2019 | Smith |
| 2019/0331442 A1 | 10/2019 | Partington |
| 2020/0206832 A1 | 7/2020 | Smith |
| 2021/0102766 A1 | 4/2021 | Partington |
| 2021/0379710 A1 | 12/2021 | Smith |
| 2022/0032417 A1 | 2/2022 | Partington |

FOREIGN PATENT DOCUMENTS

| | | |
|---|---|---|
| FR | 1075194 A | 10/1954 |
| GB | 1008029 A | 10/1965 |
| GB | 2514370 | 5/2013 |
| GB | 2514491 A | 11/2014 |

OTHER PUBLICATIONS

Kreg Tool, Quick-Start Guide, Jig Product Manual, dated 2010, 27 pages.

Kreg Newsletter, "4 Tips for Tight-Fitting Kreg Joints," available at <http://www.kregtool.com/files/newsletters/kregplus/may13.html>, dated Aug. 2013, 4 pages.

DIYdiva, "Joinery 101: Using a Kreg Jig," available at <http://diydiva.net/2011/07/joinery-101-using-a-kreg-jig/>, dated Jul. 18, 2011.

Modulus Arms, "Heavy-Duty Universal AR-15 80% Lower Receiver Jig Instructions," dated Jan. 14, 2016, 21 pages.

Iconic Industries Inc., "Legacy Instructions for Iconic Brand Jigs," <https://www.iconicindustriesinc.com/finishing-fixturesjigs>, for purposes of examination, consider published before Apr. 18, 2017, pp. 3-25.

80 Percent Arms Inc., "Easy Jig® Gen 2 Multi-Platform Milling System User Manual" dated 2017, 15 pages.

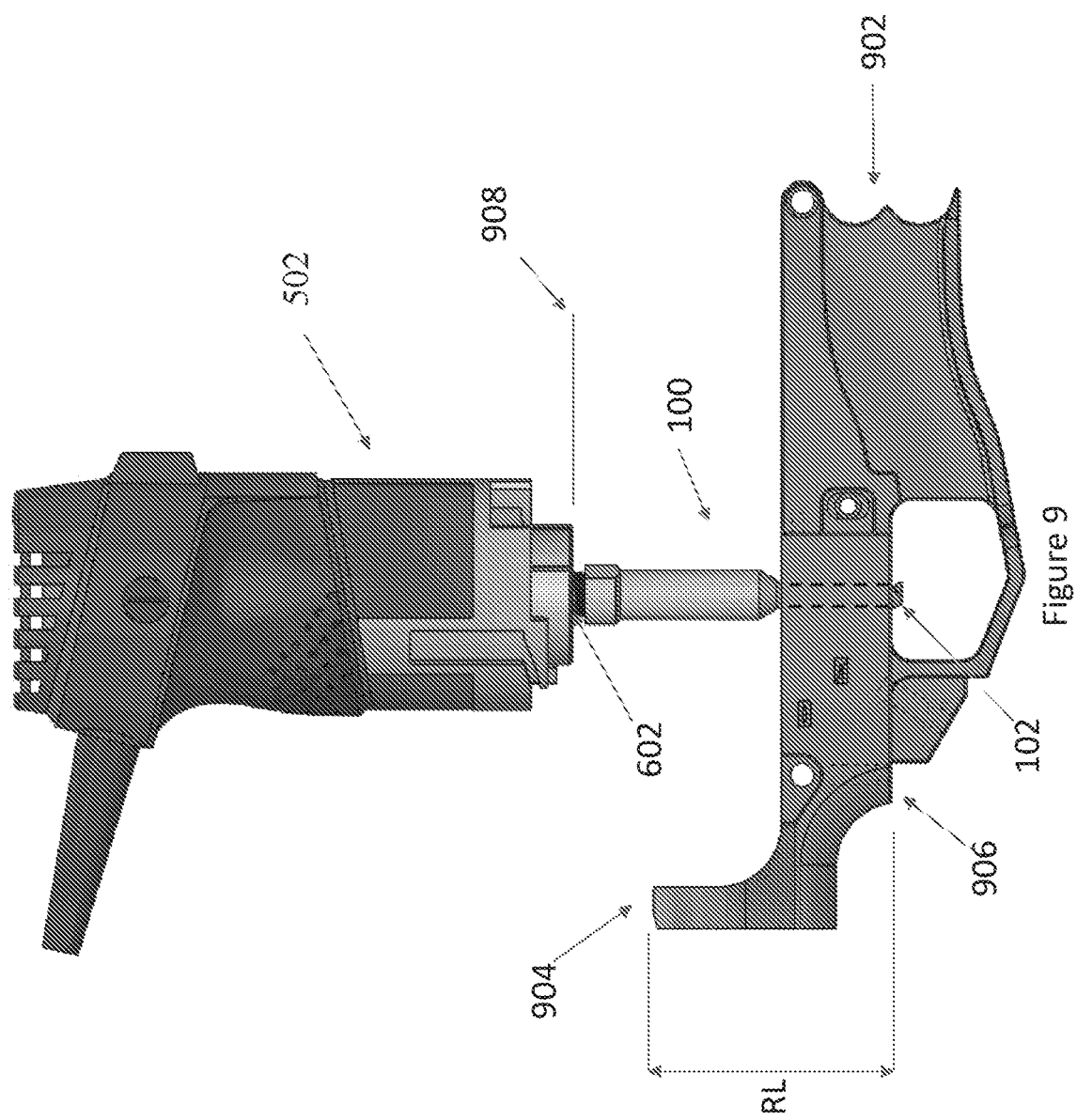

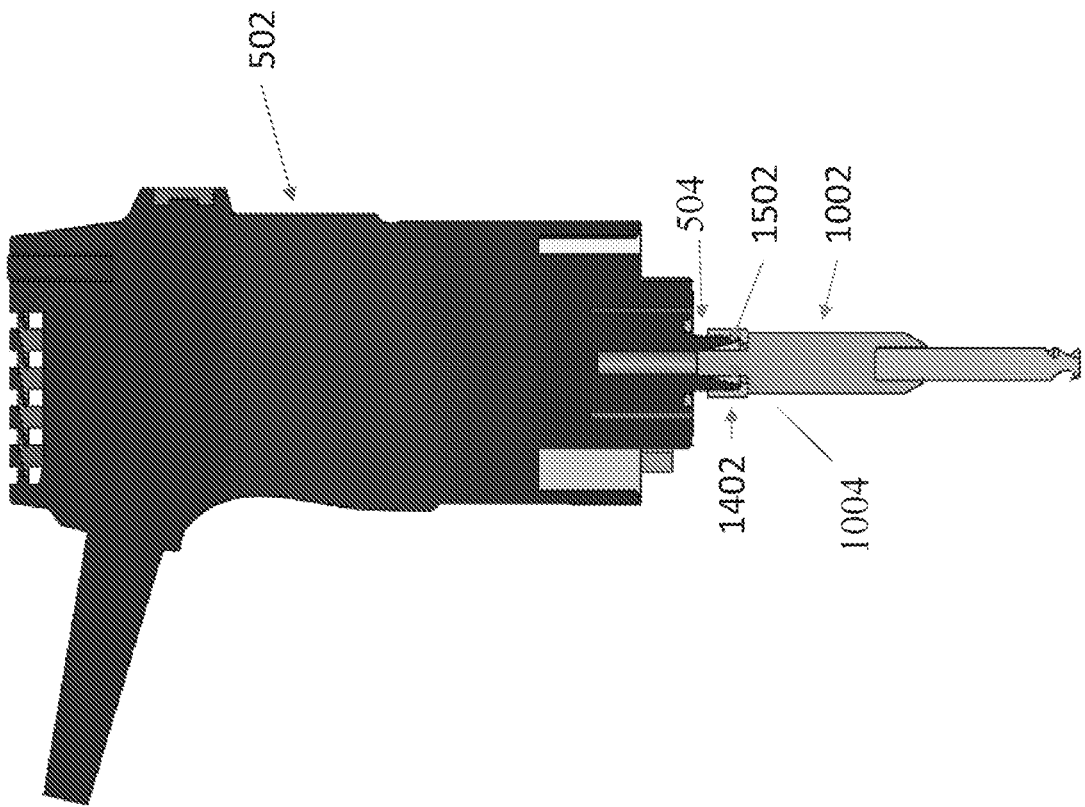
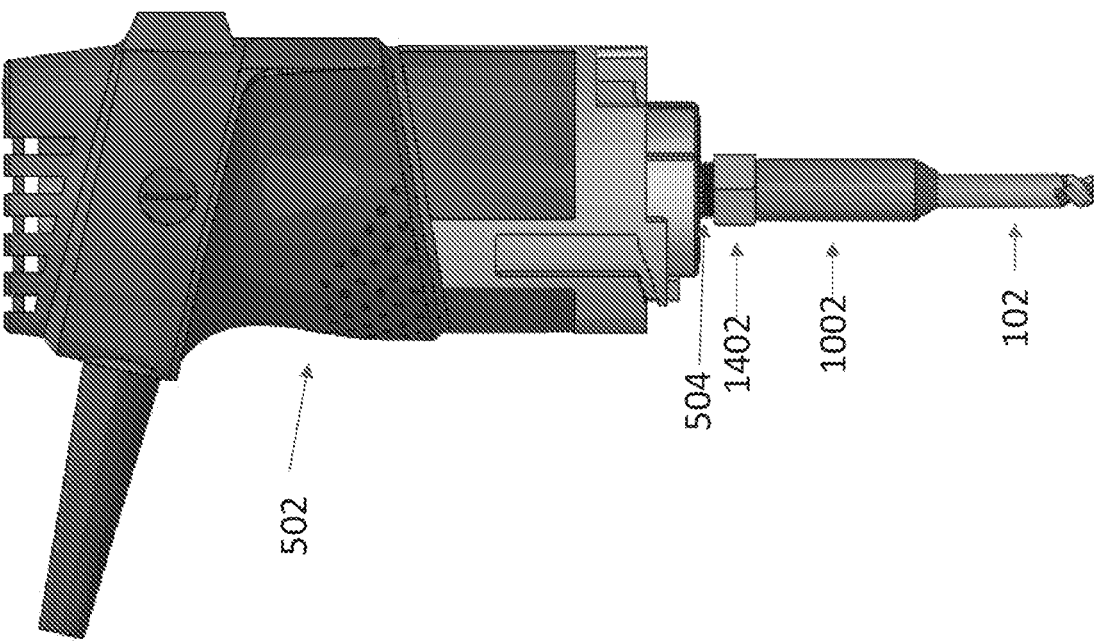

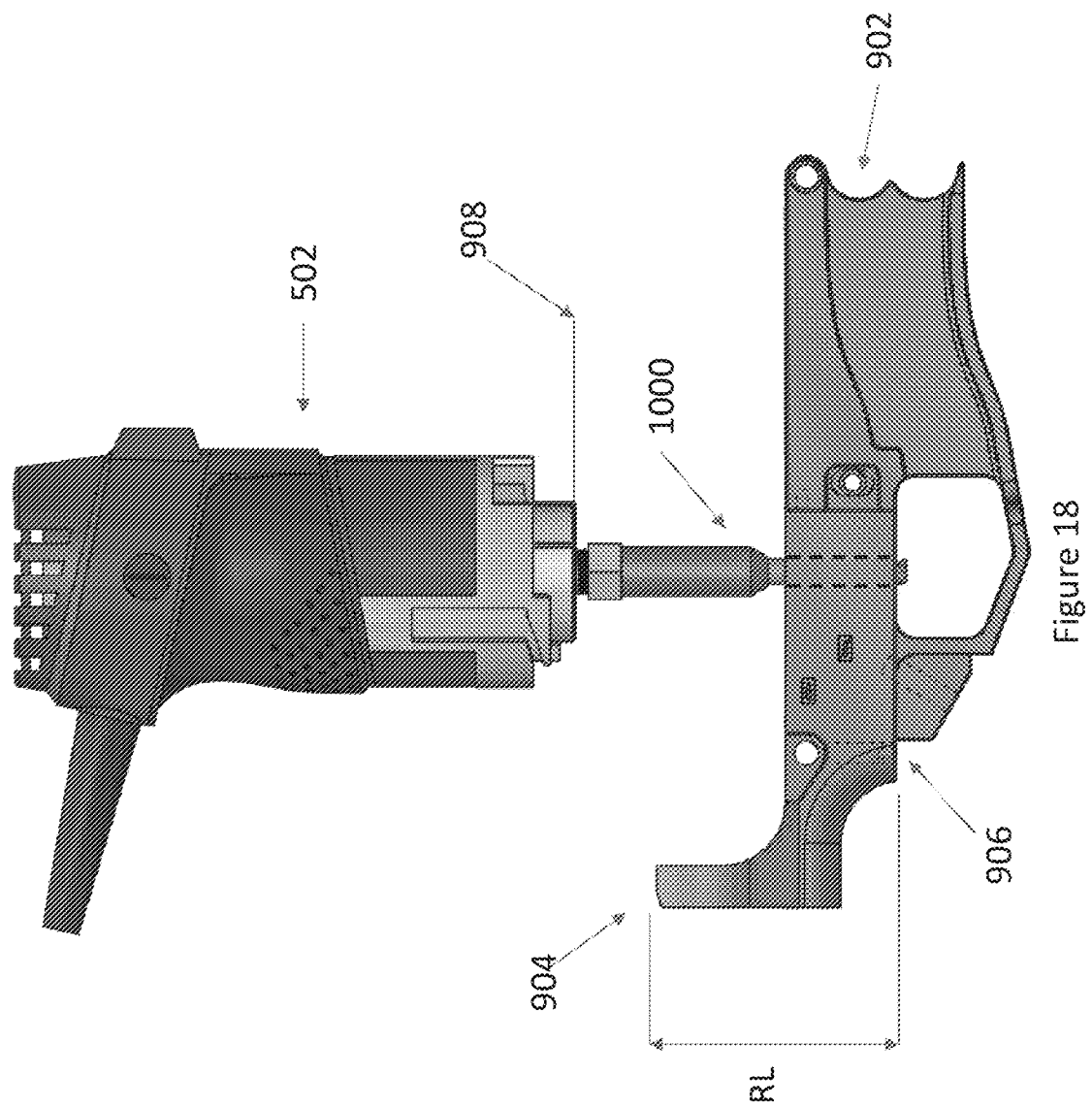

ROTARY TOOL FOR LOWER RECEIVER MANUFACTURING

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND OF THE INVENTION

Field of the Invention

This invention relates to systems and methods for manufacturing an 80% (partially unfinished) firearm receiver, with a high rate of success with improved quality, by an unskilled user.

Description of the Related Art

The AR-15 family of weapons is a popular firearm system. Many variants of the AR-15 rifle are currently offered. The AR-15 series firearms define a weapon that is composed of two major assemblies, an upper receiver and a lower receiver. The upper receiver includes the barrel group, the chamber, bolt and other parts. The lower receiver includes the trigger group, the buffer assembly, stock group and other parts. A market exists for incompletely/partially manufactured firearm lower receivers. A firearm lower receiver is unregulated until a minimum level of manufacturing is completed. This level is typically known as "80%". Firearm lower receivers completed to this level are typically referred to as "80%" lower receivers. These firearms must then be completed by the end user to be operable. In a typical configuration the lower receiver is molded, cast, extruded and/or forged and is partially machined, with certain aspects of the inner slot (in which the trigger mechanism resides) remaining uncut. The finishing task cuts this remaining slot with appropriate dimensions and accuracy.

The completion of an 80% lower receiver utilizes a rotary power tool. These tools are typically, a drill, a router or a milling machine although other tools may suffice. A rotary tool is inserted into the rotary power tool and is rotated to remove material from the lower receiver. The material removal locations have a maximum allowable rotary tool diameter to manufacture a functional lower receiver. Furthermore, the geometry of the lower receiver requires a minimum rotary tool length. These criteria are not ideal for the removal of material with a typical rotary tool. A rotary tool with a diameter and length capable of completing an operable lower receiver has poor rigidity and many drawbacks. Currently available rotary tools can experience any of a variety of problems including chatter, excessive deflection and catastrophic failure of the rotary tool shaft or cutter.

It would be desirable to provide a rotary tool to increase the quality, accuracy and longevity in the manufacturing and completion of lower receivers

SUMMARY OF THE INVENTION

This invention overcomes the disadvantages of the prior art by providing a rotary tool that has the advantages of easily interfacing with traditional rotary power tools, having a length capable of completing a lower receiver and having a large diameter where allowable and a smaller diameter where required to complete an operable lower receiver. The diameter can allow the lower receiver to function after completion and can increase the strength of the tool, thus minimizing deflection, chatter, and breakage.

In an embodiment, a rotary tool can have an adapter with a major diameter, and a cutter head with a minor diameter less than the major diameter. The rotary tool can have an overall length that can be adapted to be greater than a distance between a top surface of a lower receiver and a bottom of a trigger cavity of the lower receiver. The minor diameter can be at least 5/16 inch. The major diameter can be at least 3/8 inch. The cutter head can include two or more fluted teeth. A cutter head can be manufactured from high speed steel, tungsten carbide, tungsten steel, molybdenum steel, titanium alloy or any similarly hard material. The adapter can be removably engaged with a power tool at a receiving rotary power tool collect. The overall length of the rotary tool can be greater than a distance between the top surface of a buffer mount of a lower receiver and a bottom surface of the lower receiver.

In an embodiment, a rotary tool can have an adapter adapted to engage with a rotary power tool collet, and the adapter can have mating threads and a major diameter. The rotary tool can have a cutter head engaged with the adapter, and the cutter head can have a minor diameter less than the major diameter and at least two fluting teeth. An overall length of the rotary tool can be adapted to be greater than a distance between a top surface of a lower receiver and the bottom of the trigger cavity of the lower receiver. The minor diameter can be at least 5/16 inch. The major diameter can be at least 3/8 inch. A cutter head can be manufactured from tungsten carbide, tungsten steel, molybdenum steel, or titanium alloy.

A rotary tool can have an adapter adapted to engage with a rotary power tool collet, and the adapter can have a major diameter and an extension adapted to interface with the rotary power tool collet. The rotary tool can have a cutter head engaged with the adapter, and the cutter head can have a minor diameter less than the major diameter and at least two fluting teeth. The rotary tool can have an overall length adapted to be greater than a distance between a top surface of a lower receiver and the bottom of the trigger cavity of the lower receiver. The minor diameter can be approximately 5/16 inch. The major diameter can be at least 3/8 inch. A cutter head can be manufactured from tungsten carbide, tungsten steel, molybdenum steel, or titanium alloy.

BRIEF DESCRIPTION OF THE DRAWINGS

The invention description below refers to the accompanying drawings, of which:

FIG. 9 is a front view of a rotary tool for lower receiver manufacturing, a rotary power tool collet, a lower receiver, and a rotary power tool according to an illustrative embodiment;

FIG. 14 is a frontal view of a rotary tool for lower receiver manufacturing, a rotary power tool collet, and a rotary power tool according to an illustrative embodiment;

FIG. 15 is an exposed frontal view of a rotary tool for lower receiver manufacturing, a rotary power tool collet, and a rotary power tool, showing interior details, according to an illustrative embodiment;

FIG. 18 is a frontal view of a rotary tool for lower receiver manufacturing, a rotary power tool collet, a lower receiver, and a rotary power tool according to an illustrative embodiment.

DETAILED DESCRIPTION OF THE PREFERRED EMBODIMENT

The primary function of the rotary tool is to manufacture lower receivers with the highest quality and best accuracy. One factor in considering the accuracy of a rotary tool is the amount of deflection created by the cutting forces when finishing the lower receiver. Reduced deflection can result in greater accuracy in the machining and completion of the lower receiver.

Deflection can be reduced in many ways but primarily through reducing the length of the rotary tool, increasing the diameter of the tool and/or using a more rigid material. For example, a 3 inch long tool would deflect less than a 4 inch long tool made from the same material with the same diameter, a 2 inch diameter tool would deflect less than a 1 inch diameter tool with the same length and material, and a tungsten carbide tool would deflect less than an alloy steel tool with the same length and diameter.

Alloy steel has a lower modulus of elasticity than tungsten carbide. This causes alloy steel to deflect more for the same cutting force. Unfortunately, tungsten carbide can be much more expensive than alloy steel. There are many reasons for the cost difference in the materials, but the primary reason is the manufacturing process needed to produce the tungsten carbide. Tungsten carbide can also be extremely hard. This can make machining it nearly impossible. Tungsten carbide is typically ground to shape rather than machined. This can be a slow and tedious process that adds time and cost to the final product. There can also be limitations with grinding. For example, internal threading can be very difficult or impossible. Due to the cost of grinding, the cost of tungsten carbide and the limitations with grinding it can be infeasible to produce items from tungsten carbide.

The rotary tool introduced can us the advantages of the materials and diameters and combines them to reduce deflection and cost. This can be done by having an adapter that can be made from alloy steel with a major diameter large enough to reduce deflection and can be engaged with a cutter head made from tungsten carbide with a minor diameter small enough to produce an operable lower receiver. In another example, the cutter head could be made from a high speed steel. The cutter head can be engaged with the adapter through a variety of means including; press fit, thermal fit, a typical collet, adhesives, epoxies or other mechanical or chemical means.

Figure 1:
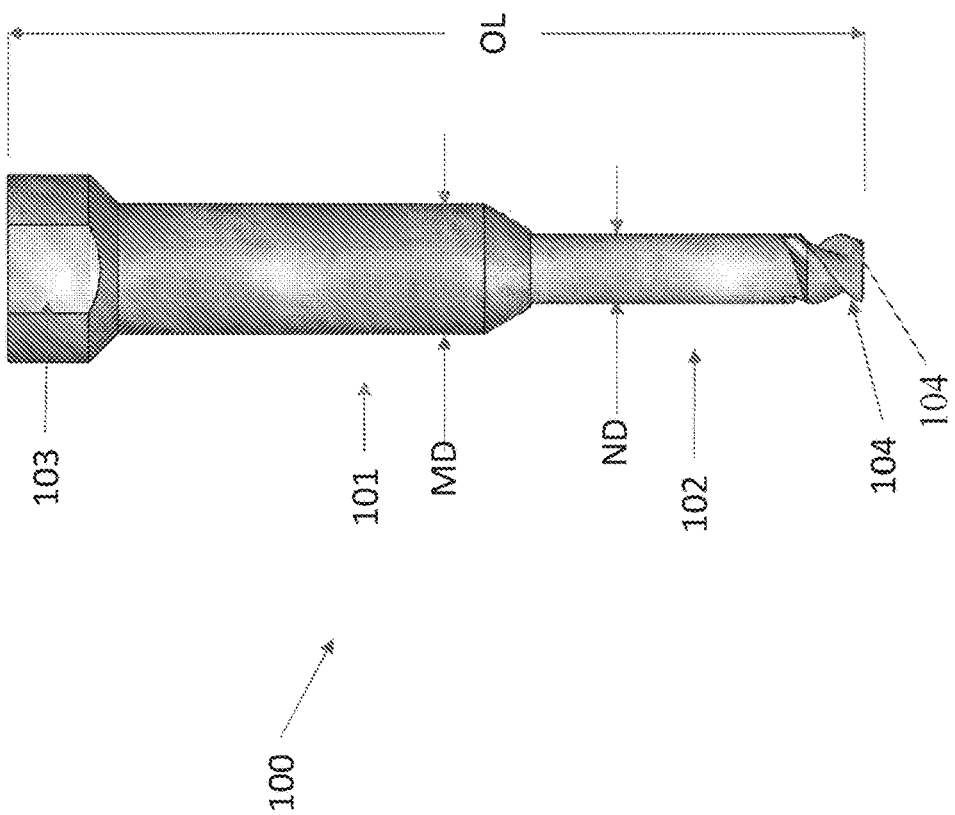
FIG. 1 is a frontal view of a rotary tool for lower receiver manufacturing, according to an illustrative embodiment.

FIG. 1 is a frontal view of a rotary tool for lower receiver manufacturing, according to an illustrative embodiment. The rotary tool 100 can include an adapter 101. Adapter 101 can be made from a variety of materials, for example, steel, alloy steel, iron, stainless steel, aluminum and other materials with appropriate material properties to minimize deflection. The adapter 101 can be engaged with a cutter head 102. Cutter head 102 can be made from any common rotary cutting tool material including; high speed steel, alloy steel, tungsten carbide, tungsten steel, molybdenum steel, titanium alloy, and other similarly hard materials. A cutter head 102 can have at least two fluting teeth 104. A cutter head 102 can have three or more fluting teeth 104. A cutter head 102 can have four or more fluting teeth 104. A cutter head 102 can have five or more fluting teeth 104. A cutter head 102 can have six or more fluting teeth 104. Fluting teeth 104 can remove material from a workpiece such as a lower receiver when the cutter head 102 is rotated against the workpiece. A rotary tool 100 can have wrench flats 103. Wrench flats 103 can be incorporated into adapter 101 to allow rotary tool 100 to be tightened onto various rotary power tools. Their size, shape and location can be very flexible, and they can be placed nearly anywhere on adapter 101 or cutter head 102. The rotary tool can have an overall tool length OL of approximately 3. 9 inches. In reference to lengths in this document, approximately means plus or minus ⅛ inch unless otherwise noted. This length OL may be longer or shorter depending upon the way the adapter is attached to the rotary power tool (shown in FIG. 5) and the details of the lower receiver. In most applications, length OL can be between 4.5 inches and 3 inches but may vary in other applications.

The adapter 101 can have a major diameter MD that can be large enough to reduce deflection. A rotary tool 100 can have a major diameter MD in a range between approximately 0.25 and 0.63 inches, but major diameter MD can be larger or smaller depending on a specific application. The rotary tool 100 can have a major diameter MD of at least ⅜ inch. A rotary tool 100 can have a major diameter MD of approximately 0.59 inches. In various embodiments, a rotary tool can have a major diameter that can be approximately ⅛ inch, approximately 3/16 inch, approximately ¼ inch, approximately 5/16 inch, approximately 3/8 inch, approximately 7/16 inch, approximately 1/2 inch, approximately 9/16 inch, approximately 5/8 inch, approximately 11/16 inch, approximately 3/4 inch, approximately 13/16 inch, approximately 7/8 inch, approximately 15/16 inch, approximately 1 inch, approximately 3 mm, approximately 4 mm, approximately 5 mm, approximately 6 mm, approximately 7 mm, approximately 8 mm, approximately 9 mm, approximately 10 mm, approximately 11 mm, approximately 12 mm and approximately 13 mm, approximately 14 mm, approximately 15 mm, approximately 16 mm, approximately 17 mm, approximately 18 mm, approximately 19 mm, approximately 20 mm, approximately 21 mm, approximately 22 mm, approximately 23 mm, approximately 24 mm, or approximately 25 mm. Cutter head 102 can have a minor diameter ND that can be large enough to reduce deflection but small enough to produce an operable lower receiver. A rotary tool 100 can have a minor diameter ND in a range between approximately 1/8 inch and 3/8 inch, but minor diameter ND can be larger or smaller depending on a specific application. The rotary tool 100 can have a minor diameter ND of at least 1/4 inch. The rotary tool 100 can have a minor diameter ND of approximately 5/16 inch. The rotary tool 100 can have a minor diameter ND of approximately 0.31 inches. In various embodiments, a rotary tool can have a minor diameter ND that can be approximately 1/8 inch, approximately 3/16 inch, approximately 1/4 inch, approximately 5/16 inch, approximately 3/8 inch, approximately 7/16 inch, approximately 1/2 inch, approximately 3 mm, approximately 4 mm, approximately 5 mm, approximately 6 mm, approximately 7 mm, approximately 8 mm, approximately 9 mm, approximately 10 mm, approximately 11 mm, approximately 12 mm or approximately 13 mm. The minor diameter ND can be selected to be an appropriate size for finishing a lower receiver, and various different lower receivers can be finished by cutter heads with different minor diameters, depending on the lower receiver. Various different major diameters can be selected, and the major diameters can be selected to be larger than the minor diameter of the cutter head.

Figure 2:
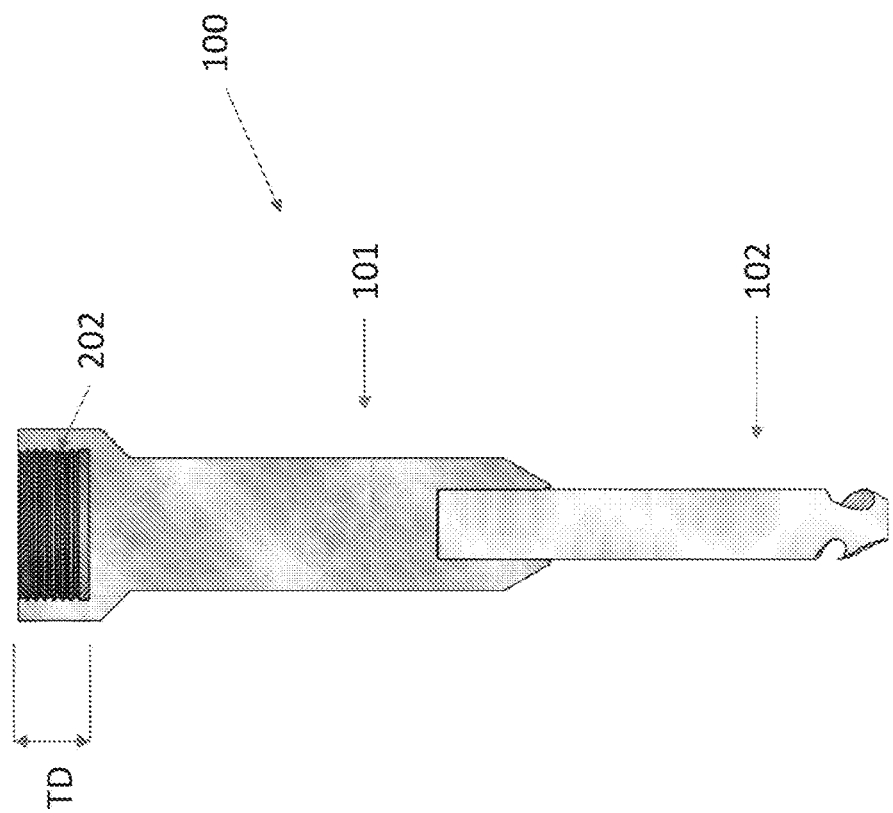
FIG. 2 is an exposed frontal view of a rotary tool for lower receiver manufacturing, showing interior details, according to an illustrative embodiment.

FIG. 2 is an exposed frontal view of the rotary tool for lower receiver manufacturing, showing interior details, according to an illustrative embodiment. Rotary tool 100 can have threads 202. Threads 202 can be of a suitable size to engage with a rotary power tool collet threads (shown in FIG. 6). Different model rotary power tools will have different threads and thus adapter 101 can have corresponding threads 202 to engage with various rotary power tools. For example, many rotary power tools have threads ranging from M14 to M20 but others exist and are applicable. Rotary tool 100 can have a thread depth TD. Thread depth TD can be variable, and can be adapted to engage with various different rotary power tools. By way of non-limiting example, a thread depth TD can be approximately 0.285 inches, but other thread depths TD are possible. Adapter 101 is designed to be removably attached to a rotary power tool by threading threads 202 onto the rotary power tool collet threads. A wrench can be engaged with wrench flats 103 to tighten the adapter 101 onto the collet threads to securely engage the adapter 101 to the collet threads.

Figure 3:
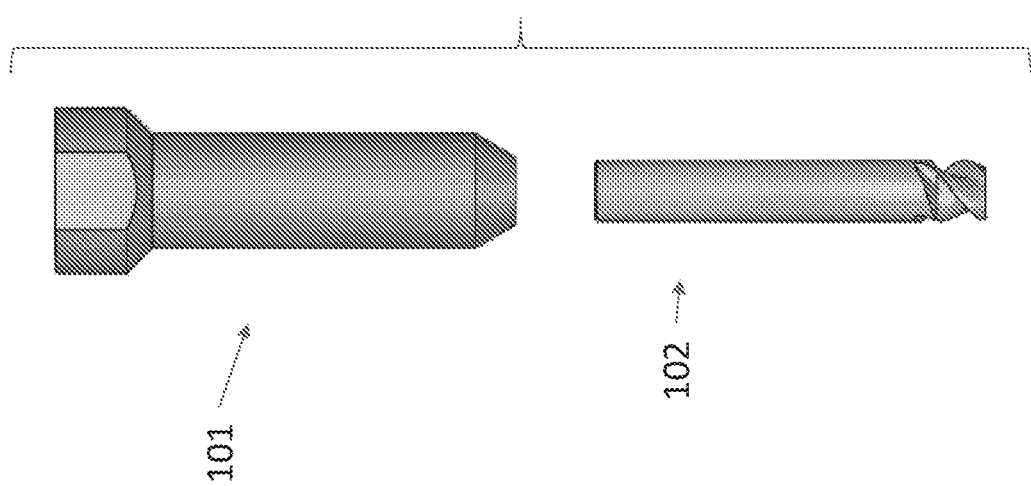
FIG. 3 is an exploded frontal view of a rotary tool for lower receiver manufacturing, according to an illustrative embodiment.

FIG. 3 is an exploded frontal view of the rotary tool for lower receiver manufacturing of FIG. 1, according to an illustrative embodiment. Rotary tool 100 can have an adapter 101 and cutter head 102, shown disengaged from each other. The cutter head 102 can be engaged with the adapter 101 through a variety of means including; press fit, thermal fit, a typical collet, adhesives, epoxies or other mechanical or chemical means.

Figure 4:
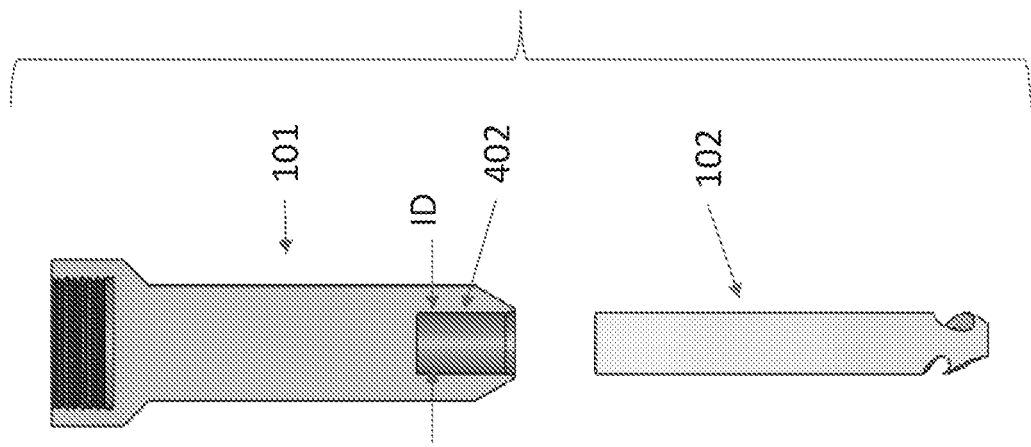
FIG. 4 is an exposed exploded frontal view of a rotary tool for lower receiver manufacturing, showing interior details, according to an illustrative embodiment.

FIG. 4 is an exposed exploded frontal view of the rotary tool for lower receiver manufacturing, showing interior details, according to an illustrative embodiment. Adapter 101 can have a cutter head engagement area 402. Cutter head engagement area 402 can be a hollow concavity within adapter 101 that can be sized and shaped to accommodate the end of the cutter head 102. In an embodiment, engagement area 402 can be cylindrical to accommodate a cylindrical end of the cutter head 102, however, other shapes of the engagement area 402 are possible to accommodate the end of the cutter head 102, depending on the shape of the end of the cutter head 102. Engagement area 402 can have an inner diameter ID that can be smaller than minor diameter ND of the cutter head 102. Inner diameter ID can vary depending on the minor diameter ND of the cutter head. Inner diameter ID can be smaller than minor diameter ND by approximately 0.005 inches or less. The amount that inner diameter ID can be smaller than minor diameter ND can vary depending on factors such as the desired degree of tightness between the adapter 101 and the cutter head 102, the push-in force required to push the cutter head 102 into the adapter 101, etc. When the engagement area 402 is heated it can expand and allows cutter head 102 to be inserted. The fraction of an inch that inner diameter ID can be smaller than minor diameter ND can vary depending on the minor diameter ND, because an adapter 101 adapted for a cutter head 102 with a larger diameter ND can expand more when heated than an adapter 101 adapted for a cutter head 102 with a smaller diameter ND. When adapter 101 cools, it can constrict around cutter head 102, and a mechanical bond can be made between cutter head 102 and adapter 101. Cutter head 102 can also be secured to adapter 101 in a variety of other ways including; pressing without heat, adhesives, epoxies, solders, brazes, a standard collet arrangement and many other mechanical and chemical means. For example, adapter 101 may have a flat bottom surface without engagement area 402, and with cutter head 102 brazed onto adapter 101. Adapter 101 and cutter head 102 are shown disengaged for illustrative purposes.

Figure 5:
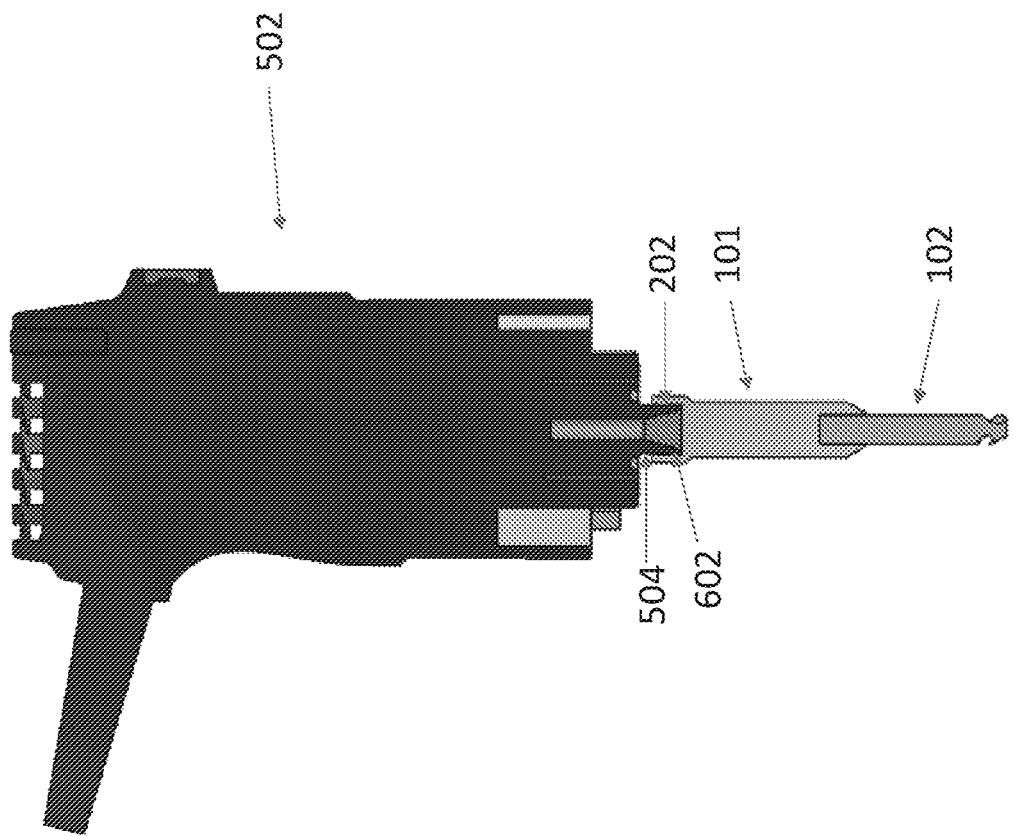
FIG. 5 is a frontal view of a rotary tool for lower receiver manufacturing and a rotary power tool, according to an illustrative embodiment.

FIG. 5 is a frontal view of a rotary tool for lower receiver manufacturing and a rotary power tool, according to an illustrative embodiment. The rotary tool 100 can be engaged with a rotary power tool 502. A rotary power tool 502 can have a collet 504 with collet threads (shown in FIG. 6). The threads 202 of the rotary tool 100 can be engaged with the collet threads of the collet 504 on the rotary power tool 502. Rotary tool 100 can be tightened onto the collet 504 of the rotary power tool 502 using wrench flats 103.

Figure 6:
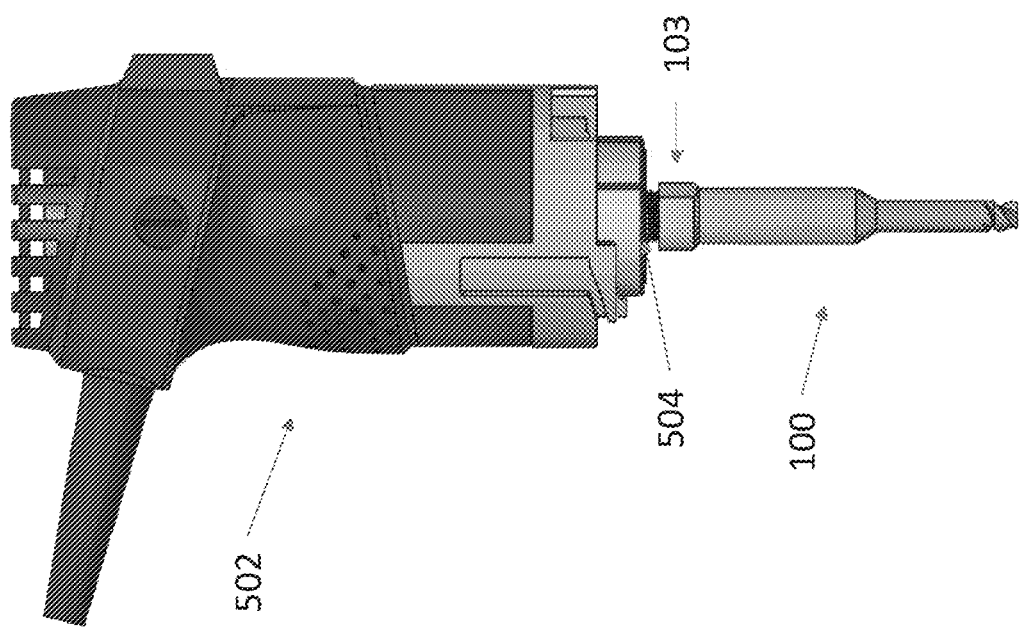
FIG. 6 is an exposed frontal view of a rotary tool for lower receiver manufacturing and a rotary power tool, showing interior details, according to an illustrative embodiment.

FIG. 6 is an exposed frontal view of a rotary tool for lower receiver manufacturing and a rotary power tool, showing interior details, according to an illustrative embodiment. Cutter head 102 can be engaged with adapter 101, and the rotary tool 100 can be engaged with the rotary power tool 502. Collet 504 can have collet threads 602. The threads 202 of adapter 101 can be engaged with the collet threads 602 on the rotary power tool 502, so that the rotary tool 100 can be secured to the rotary power tool 502. Securing the rotary tool 100 to the rotary power tool 502 can allow them to rotate in unison.

Figure 7:
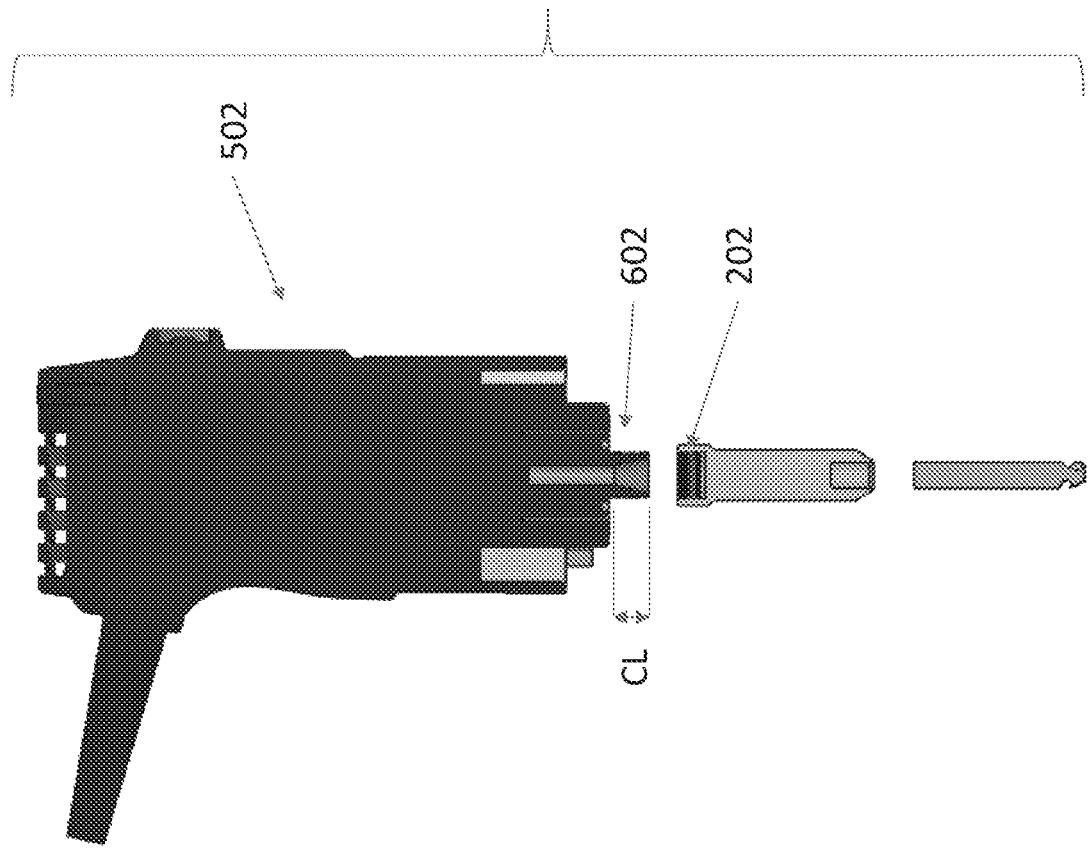
FIG. 7 is an exploded frontal view of a rotary tool for lower receiver manufacturing and rotary power tool, according to an illustrative embodiment.

FIG. 7 is an exploded frontal view of a rotary tool for lower receiver manufacturing and rotary power tool, according to an illustrative embodiment. Adapter 101 is shown below rotary power tool 502 with cutter head 102 disposed below adapter 101. The threads of the adapter 101 can be engaged with collet threads 602 of the rotary power tool 502. Adapter 101 can be tightened onto the rotary power tool 502 using wrench flats 103. Rotary power tool 502, adapter 101, and cutter head 102 are shown disengaged for illustrative purposes.

Figure 8:
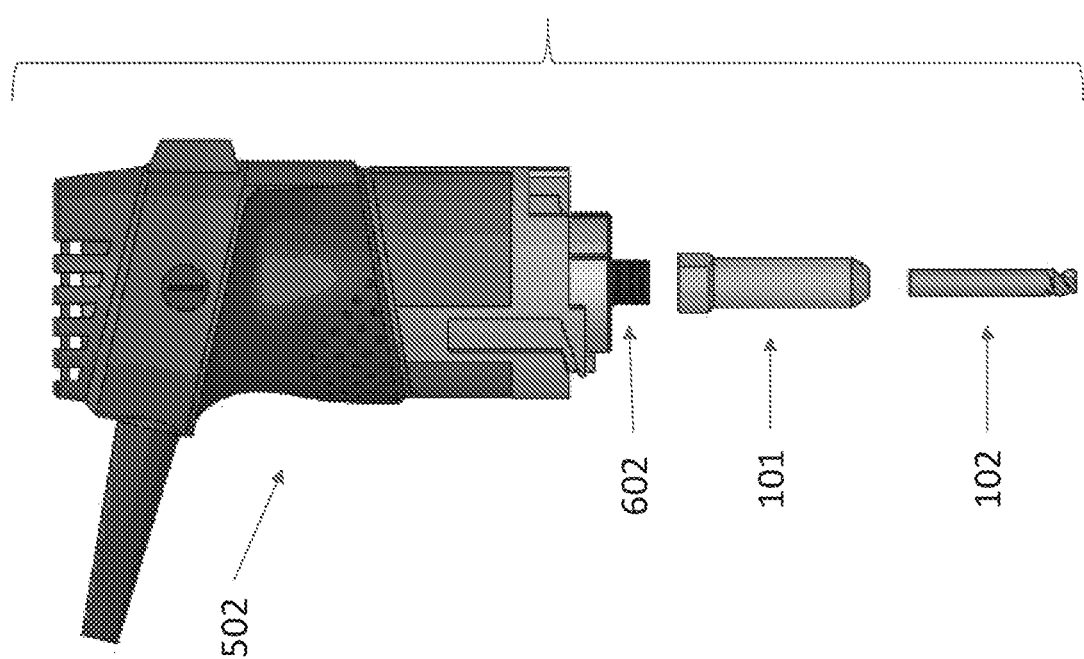
FIG. 8 is an exposed exploded frontal view of a rotary tool for lower receiver manufacturing and a rotary power tool, showing interior details, according to an illustrative embodiment.

FIG. 8 is an exposed exploded frontal view of a rotary tool for lower receiver manufacturing and a rotary power tool, showing interior details, according to an illustrative embodiment. A collet 504 can have a collet length CL. Collet length CL can be highly variable, depending on the preferences of the manufacturer of a rotary power tool 502. By way of non-limiting example, a Bosch model #PR10E rotary power tool can have a collect length CL of approximately 0.48 inches, and a collect diameter of approximately 14 mm, however, these dimensions can be variable depending on the individual rotary power tool. Adapter threads 202 are shown below rotary power tool collect threads 602. The threads 202 of the adapter 101 can be engaged with collect threads 602 of the rotary power tool 502. Adapter 101 can be tightened onto the rotary power tool 502 using wrench flats 103. Rotary power tool 502, adapter 101, and cutter head 102 are shown disengaged for illustrative purposes.

FIG. 9 is a front view of a rotary tool for lower receiver manufacturing, a rotary power tool collet, a lower receiver, and a rotary power tool according to an illustrative embodiment. A lower receiver 902 can have an upper surface 904 and a lower surface 906. Upper surface 904 is located at the top of the lower receiver at a position typically referred to as the top of buffer tower. Upper surface 904 is located at the top of the buffer tower. Lower surface 906 is located towards the middle of the lower receiver at a position typically referred to as the bottom of the trigger cavity. Lower surface 906 is located at the bottom of the trigger cavity. Receiver distance RL is the distance between upper surface 904 and lower surface 906. Rotary power tool surface 908 is located at the bottom of the rotary power tool 502 excluding the collect 504. The cutter head 102 can engage within the lower receiver 902 in a location necessary for completion of the lower receiver 902. Rotary tool 100 overall length OL can be sufficiently long to allow for rotary power tool surface 908 on the rotary power tool 502 to avoid upper surface 904. When cutter 102 is engaged to the required depth within lower receiver 902, rotary power tool surface 908 can be above upper surface 904, or put another way, rotary power tool surface 908 is not between the plane of upper surface 904 and the plane of lower surface 906, or put another way, rotary power tool surface 908 is not within receiver distance RL. For rotary power tool surface 908 to remain above upper surface 904, rotary tool 100 can have an overall length OL that can be longer than the receiver distance RL between lower surface 906 and upper surface 904.

Variations in sizes of collets can also affect the overall length OL that can allow rotary power tool surface 908 to remain above upper surface 904. Overall length OL can decrease directly as the length of the collect increases, because the increased collet length can decrease the overall length OL required to keep rotary power tool surface 908 above upper surface 904. A portion of the collet length can overlap with the overall length OL, because a portion of the collet can be threaded into the threads 202. Overall length OL can be at least RL, minus the portion of the collet that does not overlap with the adapter threads. The length of a collet can be widely variable depending on the preferences of the manufacturer of a rotary power tool. By way of non-limiting example, collet length CL can be 0.48 inch, and the thread depth TD of adapter 101 can be approximately 0.285 inch, so the portion of the collect length that does not overlap with the adapter threads can be approximately 0.195 inch, and the overall length OL can be at least RL, minus 0.195 inch. Receiver distance RL varies with different lower receivers and therefore the distances between upper surface 904, lower surface 906, and rotary power tool surface 908 can vary depending upon the application. By way of non-limiting example, receiver distance RL can be approximately 2.9 inches, however, different receiver distances RL are possible with different receivers. By way of non-limiting example, overall length OL can be at least RL minus the overlap between the collet length and the thread depth, so overall length OL can be at least approximately 2.9 inches minus 0.195 inches, for an overall length OL of at least approximately 2.705, plus enough additional length to ensure the bottom of the cutter head can extend to just below the lower surface 906.

Figure 10:
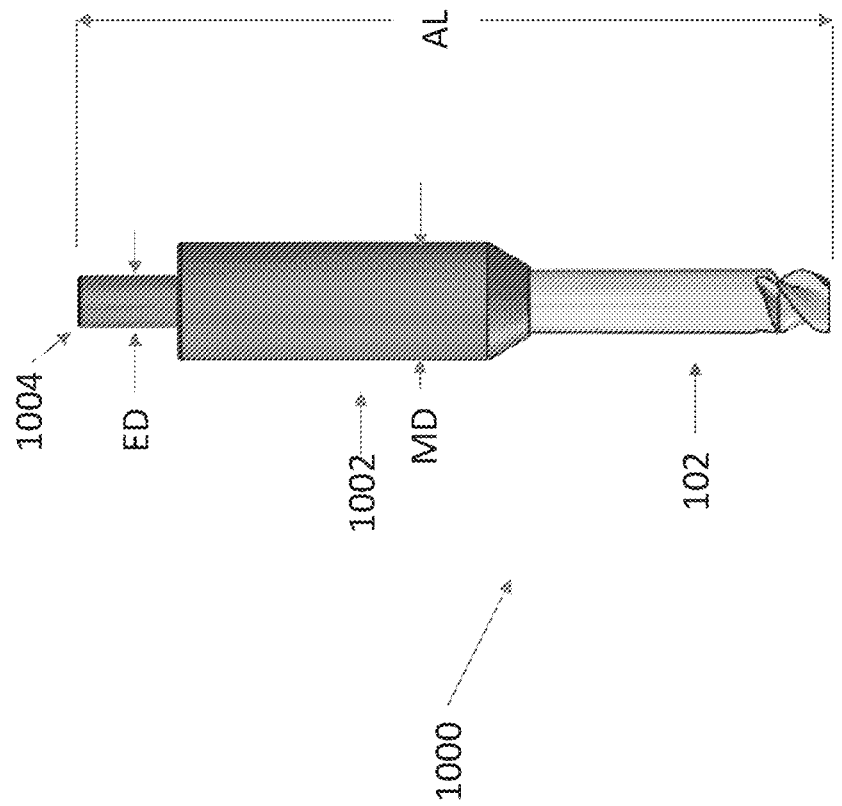
FIG. 10 is a frontal view of a rotary tool for lower receiver manufacturing, according to another illustrative embodiment.

FIG. 10 is a frontal view of a rotary tool for lower receiver manufacturing, according to another illustrative embodiment. A rotary tool 1000 can include a cutter head 102 and an extension adapter 1002. Extension adapter 1002 can be free of threads 202. Extension adapter 1002 can have an extension 1004. Extension 1004 has an engagement diameter ED sized for engagement with a rotary power tool collect. In an embodiment, engagement diameter ED can be approximately ¼ inch. Engagement diameter ED may vary with various rotary power tool collets, and engagement diameter ED can be adapted to be engaged within various power tool collets. Common collet sizes include; ⅛ inch, 3/16 inch, ¼ inch, 5/16 inch, ⅜ inch, 7/16 inch, ½ inch, 3 mm, 4 mm, 5 mm, 6 mm, 7 mm, 8 mm, 9 mm, 10 mm, 11 mm, 12 mm, and others, and extension 1004 can have an engagement diameter ED sized to correspond with the various collet sizes. Extension adapter 1002 can have a major diameter MD and engagement area 402 similar to adapter 101. Rotary tool 1000 can have an overall length AL that can be approximately 3.75 inches. This length may be longer or shorter depending upon the rotary power tool collet and the details of the lower receiver.

A rotary tool 1000 can have a major diameter MD of approximately 0.5 9 inches. In various embodiments, a rotary tool can have a major diameter that can be approximately ⅛ inch, approximately 3/16 inch, approximately ¼ inch, approximately 5/16 inch, approximately ⅜ inch, approximately 7/16 inch, approximately ½ inch, approximately 9/16 inch, approximately ⅝ inch, approximately 11/16 inch, approximately ¾ inch, approximately 13/16 inch, approximately ⅞ inch, approximately 15/16 inch, approximately 1 inch, approximately 3 mm, approximately 4 mm, approximately 5 mm, approximately 6 mm, approximately 7 mm, approximately 8 mm, approximately 9 mm, approximately 10 mm, approximately 11 mm, approximately 12 mm and approximately 13 mm, approximately 14 mm, approximately 15 mm, approximately 16 mm, approximately 17 mm, approximately 18 mm, approximately 19 mm, approximately 20 mm, approximately 21 mm, approximately 22 mm, approximately 23 mm, approximately 24 mm, or approximately 25 mm. Cutter head 102 can have a minor diameter ND that can be large enough to reduce deflection but small enough to produce an operable lower receiver. A rotary tool 1000 can have a minor diameter ND in a range between approximately ⅛ inch and ⅜ inch, but minor diameter ND can be larger or smaller depending on a specific application. The rotary tool 1000 can have a minor diameter ND of at least ¼ inch. The rotary tool 1000 can have a minor diameter ND of approximately 5/16 inch. The rotary tool 1000 can have a minor diameter ND of approximately 0.25 inches. In various embodiments, a rotary tool can have a minor diameter ND that can be approximately ⅛ inch, approximately 3/16 inch, approximately 1/4 inch, approximately 5/16 inch, approximately 3/8 inch, approximately 7/16 inch, approximately 1/2 inch, approximately 3 mm, approximately 4 mm, approximately 5 mm, approximately 6 mm, approximately 7 mm, approximately 8 mm, approximately 9 mm, approximately 10 mm, approximately 11 mm, approximately 12 mm or approximately 13 mm.

Figure 11:
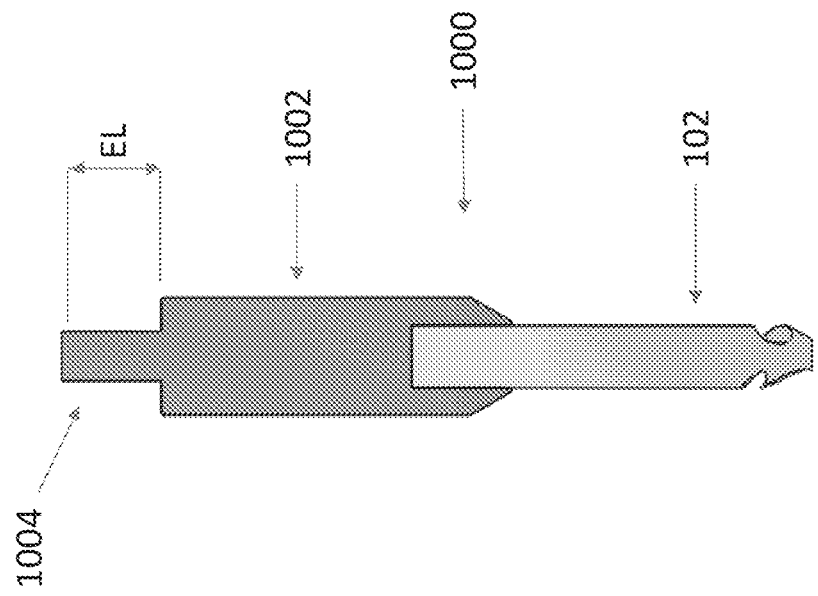
FIG. 11 is an exposed frontal view of a rotary tool for lower receiver manufacturing, showing interior details, according to an illustrative embodiment.

FIG. 11 is an exposed frontal view of a rotary tool for lower receiver manufacturing, showing interior details, according to an illustrative embodiment. Rotary tool 1000 can have a cutter head 102 and an extension adapter 1002 with an extension 1004. Extension 1004 can have an extension length EL that can be approximately 1/4 inch. Extension 1004 can have an extension length EL that can be approximately 3/8 inch. Extension 1004 can have an extension length EL that can be approximately 1/2 inch. Extension 1004 can have an extension length EL that can be approximately 5/8 inch. Extension 1004 can have an extension length EL of approximately 3/4 inch. Extension 1004 can have an extension length EL of approximately 1 inch. Extension 1004 can have an extension length EL of at least 1/4 inch. Extension length EL can vary based on the rotary power tool collet and other application considerations.

Figure 12:
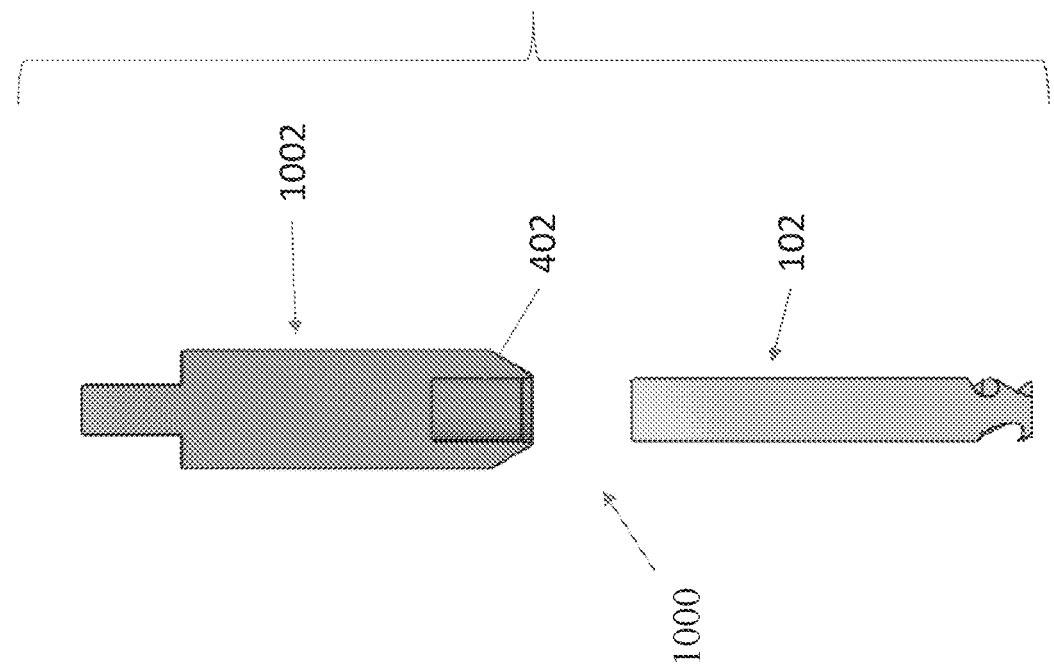
FIG. 12 is an exploded frontal view of a rotary tool for lower receiver manufacturing, according to an illustrative embodiment.

FIG. 12 is an exploded frontal view of a rotary tool for lower receiver manufacturing, according to an illustrative embodiment. Rotary tool 1000 can have an extension adapter 1002 and cutter head 102, shown disengaged from each other. The cutter head 102 can be engaged with the extension adapter 1002 through a variety of means including; press fit, thermal fit, a typical collet, adhesives, epoxies or other mechanical or chemical means.

Figure 13:
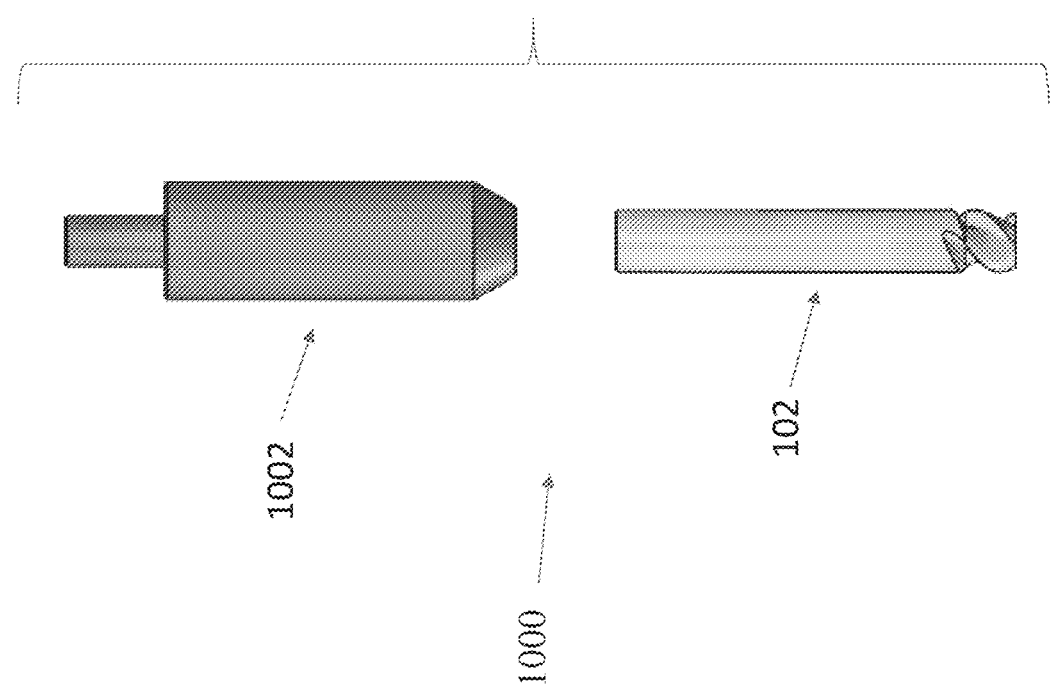
FIG. 13 is an exposed exploded frontal view of a rotary tool for lower receiver manufacturing, showing interior details, according to an illustrative embodiment.

FIG. 13 is an exposed exploded frontal view of a rotary tool for lower receiver manufacturing, showing interior details, according to an illustrative embodiment. Extension adapter 1002 can have a cutter head engagement area 402. Cutter head engagement area 402 can be a hollow concavity within adapter 101 that can be sized and shaped to accommodate the end of the cutter head 102. In an embodiment, engagement area 402 can be cylindrical to accommodate a cylindrical end of the cutter head 102, however, other shapes of the engagement area 402 are possible to accommodate the end of the cutter head 102, depending on the shape of the end of the cutter head 102. Engagement area 402 can have a diameter smaller than minor diameter ND of the cutter head 102. When the engagement area 402 is heated it can expand and allows cutter head 102 to be inserted. When extension adapter 1002 cools, it can constrict around the cutter head 102, and a mechanical bond can be made between cutter head 102 and extension adapter 1002. Cutter head 102 can also be secured to adapter 101 in a variety of other ways including; pressing without heat, adhesives, epoxies, solders, brazes, a standard collet arrangement and many other mechanical and chemical means. For example, extension adapter 1002 may have a flat bottom surface without engagement area 402, and with cutter head 102 brazed onto the extension adapter 1002. Extension adapter 1002 and cutter head 102 and shown disengaged for illustrative purposes.

FIG. 14 is a frontal view of a rotary tool for lower receiver manufacturing, a rotary power tool collet, and a rotary power tool according to an illustrative embodiment. A rotary power tool 502 can have a collect 504 with a collect nut 1402. Extension 1004 of extension adapter 1002 can be inserted into the collet 504, and collet nut 1402 can be tightened onto collet threads 602 after extension 202 is inserted into the collet 504 to secure the extension 1004 within the collet 504. Securing the extension 1004 within the collect 504 can create a mechanical bond between extension adapter 1002 and rotary power tool 502 allowing them to rotate in unison.

FIG. 15 is an exposed frontal view of a rotary tool for lower receiver manufacturing, a rotary power tool collect, and a rotary power tool, showing interior details, according to an illustrative embodiment. A collet 504 can have collet nut 1402 and a collet clamp 1502. Extension 1004 can be engaged in collet clamp 1502. When collet nut 1402 is tightened onto collet threads 602, collet clamp 1502 is forced into the collet 504, so that collet clamp 1502 clamps onto extension 1004. Clamping collet clamp 1502 onto extension 1004 can engage rotary power tool 502 with rotary tool 1000, so that rotary power tool 502 and rotary tool 1000 can spin in unison.

Figure 16:
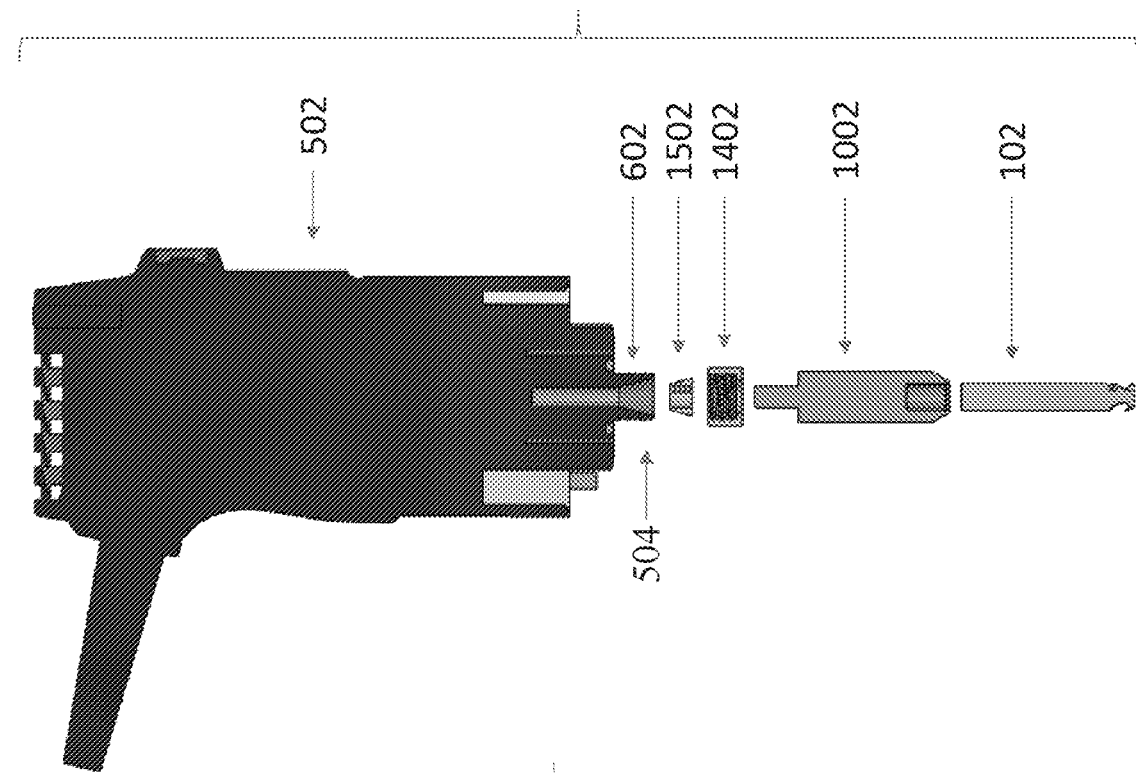
FIG. 16 is an exploded frontal view of a rotary tool for lower receiver manufacturing, a rotary power tool collet, and a rotary power tool, according to an illustrative embodiment.

FIG. 16 is an exploded frontal view of a rotary tool for lower receiver manufacturing, a rotary power tool collect, and a rotary power tool, according to an illustrative embodiment. Rotary tool 502 can have a collet 504, and collet 504 can have collet threads 602, collet clamp 1502, and collet nut 1402.

Figure 17:
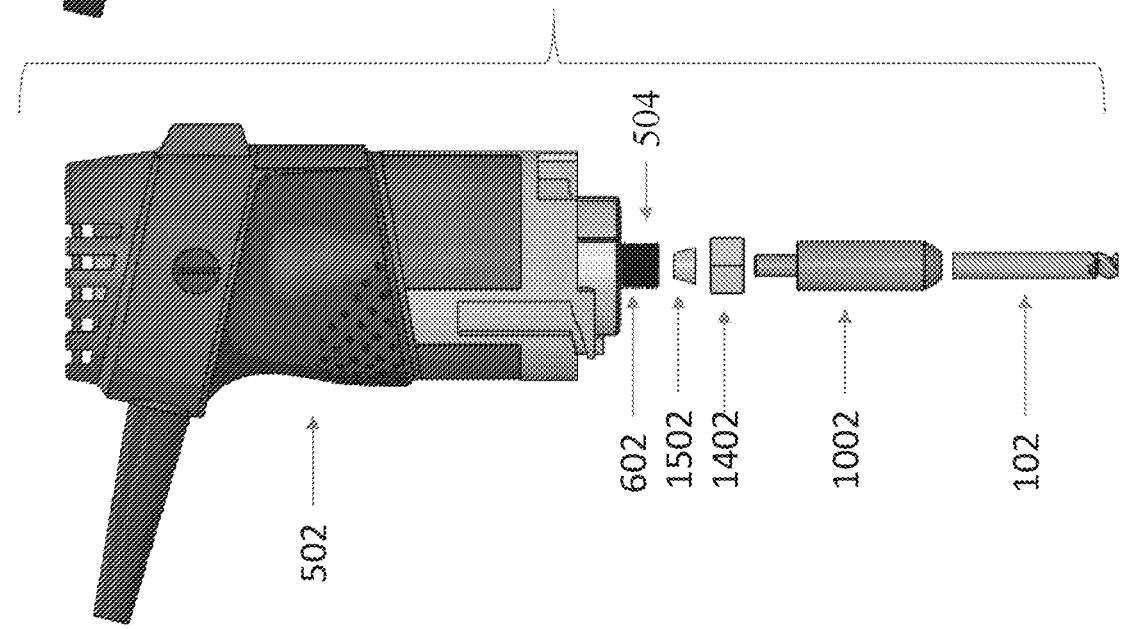
FIG. 17 is an exposed exploded frontal view of a rotary tool for lower receiver manufacturing, a rotary power tool collet, and a rotary power tool, showing interior details, according to an illustrative embodiment.

FIG. 17 is an exposed exploded frontal view of a rotary tool for lower receiver manufacturing, a rotary power tool collect, and a rotary power tool, showing interior details, according to an illustrative embodiment. Extension 1004 is shown below collet 504. Extension 1004 can be inserted within collet clamp 1502, and collet nut 1402 can be threaded on collet threads 602 to clamp extension 1004 within collet 504.

FIG. 18 is a frontal view of a rotary tool for lower receiver manufacturing, a rotary power tool collect, a lower receiver, and a rotary power tool according to an illustrative embodiment. A lower receiver 902 can have an upper surface 904 and a lower surface 906. Upper surface 904 is located at the top of the lower receiver at a position typically referred to as the top of buffer tower. Upper surface 904 is located at the top of the buffer tower. Lower surface 906 is located towards the middle of the lower receiver at a position typically referred to as the bottom of the trigger cavity. Lower surface 906 is located on at the bottom of the trigger cavity. Receiver distance RL is the distance between upper surface 904 and lower surface 906. Rotary power tool surface 908 is located at the bottom of the rotary power tool 502 excluding the collect 504, as shown in FIG. 18. The cutter head 102 can be engaged within the lower receiver 902 in a location necessary for completion of the lower receiver 902. Rotary tool 1000 overall length AL can be sufficiently long to allow for rotary power tool surface 908 on the rotary power tool 502 to avoid upper surface 904. When cutter 102 is engaged to the required depth within lower receiver 902, rotary power tool surface 908 can be above upper surface 904, or put another way, rotary power tool surface 908 is not between the plane of upper surface 904 and the plane of lower surface 906, or put another way, rotary power tool surface 908 is not within receiver distance RL. For rotary power tool surface 908 to remain above upper surface 904, rotary tool 1000 can have an overall length AL that can be longer than the than the receiver distance RL between upper surface 906 and lower surface 904.

Variations in sizes of collets can also affect the overall length AL that can allow rotary power tool surface 908 to remain above upper surface 904. Overall length AL can decrease directly as the length of the collect increases, because the increased collect length can decrease the overall length AL required to keep rotary power tool surface 908 above upper surface 904. A portion of the collect length can overlap with the overall length AL, because at least a portion of extension 1004 can be inserted into the collect clamp. Overall length AL can be at least RL, minus the portion of the extension 1004 that is inserted into the collect clamp 1502. The length of a collect can be widely variable depending on the preferences of the manufacturer of a rotary power tool. By way of non-limiting example, collet length CL can be 0.48 inch, and the extension length EL of extension 1004 can be approximately 0.25 inch, so the portion of the collet length that does not overlap with the adapter threads can be approximately 0.23 inch, and the overall length OL can be at least RL, minus 0.23 inch. Receiver distance RL varies with different lower receivers and therefore the distances between upper surface 904, lower surface 906, and rotary power tool surface 908 can vary depending upon the application. By way of non-limiting example, receiver distance RL can be approximately 2.9 inches, however, different receiver distances RL are possible with different receivers. By way of non-limiting example, overall length OL can be at least RL minus the overlap between the collet length and the thread depth, so overall length OL can be at least approximately 2.9 inches minus 0.23 inches, for an overall length OL of at least approximately 2.67, plus enough additional length to ensure the bottom of the cutter head can extend to just below the lower surface 906.

The foregoing has been a detailed description of illustrative embodiments of the invention. Various modifications and additions can be made without departing from the spirit and scope if this invention. Each of the various embodiments described above may be combined with other described embodiments in order to provide multiple features. As used herein the directional terms, such as, but not limited to, "up" and "down", "upward" and "downward", "rear", "rearward" and "forward", "top" and "bottom", "inside" and "outer", "front" and "back", "inner" and "outer", "interior" and "exterior", "downward" and "upward", "upper" and "lower", "horizontal" and "vertical" should be taken as relative conventions only, rather than absolute indications of orientation or direction with respect to an acting direction of the force of gravity. Furthermore, while the foregoing describes a number of separate embodiments of the apparatus and method of the present invention, what has been described herein is merely illustrative of the application of the principles of the present invention. For example, the foregoing rotary tool can be constructed with greater and lesser dimensions. It is contemplated that a variety of rotary tools of diverse sizes can be provided as a kit. The rotary tool can be used in other applications for machining other firearms, or pieces of non-firearm equipment. The rotary tool can be provided with more than two fluted teeth, with a greater or lesser pitch length. Accordingly, this description is meant to be taken only by way of example, and not to otherwise limit the scope of this invention.

What is claimed is:

1. A rotary tool comprising:
    an adapter configured to engage with a rotary power tool collet, the adapter comprising:
        an extension portion having an engagement diameter and an extension length and configured to be received within a rotary power tool collet; and
        a shaft portion having a major diameter; and
    a cutter head engaged with the shaft portion of the adapter by a thermal fit, the cutter head comprising:
        a minor diameter less than the major diameter; and
        at least two fluting teeth;
    wherein an overall length of the rotary tool is configured to be greater than a distance between a top surface of a buffer tower of a firearm lower receiver and a bottom of a trigger cavity of the firearm lower receiver.

2. The rotary tool of claim 1, wherein the minor diameter is at least ¼ inch.

3. The rotary tool of claim 1, wherein the major diameter is at least ⅜ inch.

4. The rotary tool of claim 1, wherein the cutter head is manufactured from tungsten carbide, tungsten steel, molybdenum steel, or titanium alloy.

5. The rotary tool of claim 1, wherein a length of the extension portion is approximately ¼ inch.

6. The rotary tool of claim 1, wherein the overall length is approximately 2.7 inches.

7. The rotary tool of claim 1, further comprising a collet nut, the collet nut configured to engage with external threads on the rotary power tool collet.

8. The rotary tool of claim 7, further comprising a collet clamp, the collet clamp configured to be disposed around the extension portion.

9. The rotary tool of claim 8, wherein the collet clamp is at least partially received within the rotary power tool collet.

10. A system configured to manufacture an incompletely manufactured firearm lower receiver, comprising:
    a firearm lower receiver having a top surface of a buffer tower and a trigger cavity portion; and
    a rotary tool comprising:
        an adapter including an extension portion configured to engage within a rotary power tool collet, the adapter having a major diameter; and
        a cutter head engaged with the adapter, the cutter head having a minor diameter less than the major diameter, and wherein an overall length of the rotary tool is configured to be greater than a distance between the top surface of the firearm lower receiver and a bottom of the trigger cavity portion of the firearm lower receiver.

11. The system of claim 10, wherein the minor diameter is at least ¼ inch.

12. The system of claim 10, wherein the major diameter is at least ⅜ inch.

13. The system of claim 10, wherein the cutter head includes at least two fluting teeth.

14. The system of claim 10, wherein the cutter head is manufactured from tungsten carbide, tungsten steel, molybdenum steel, or titanium alloy.

15. The system of claim 10, herein the adapter comprises internal threads configured to engage with the rotary power tool collet.

16. The system of claim 10, wherein the overall length is approximately 2.7 inches.

* * * * *